United States Patent Office 2,765,359
Patented Oct. 2, 1956

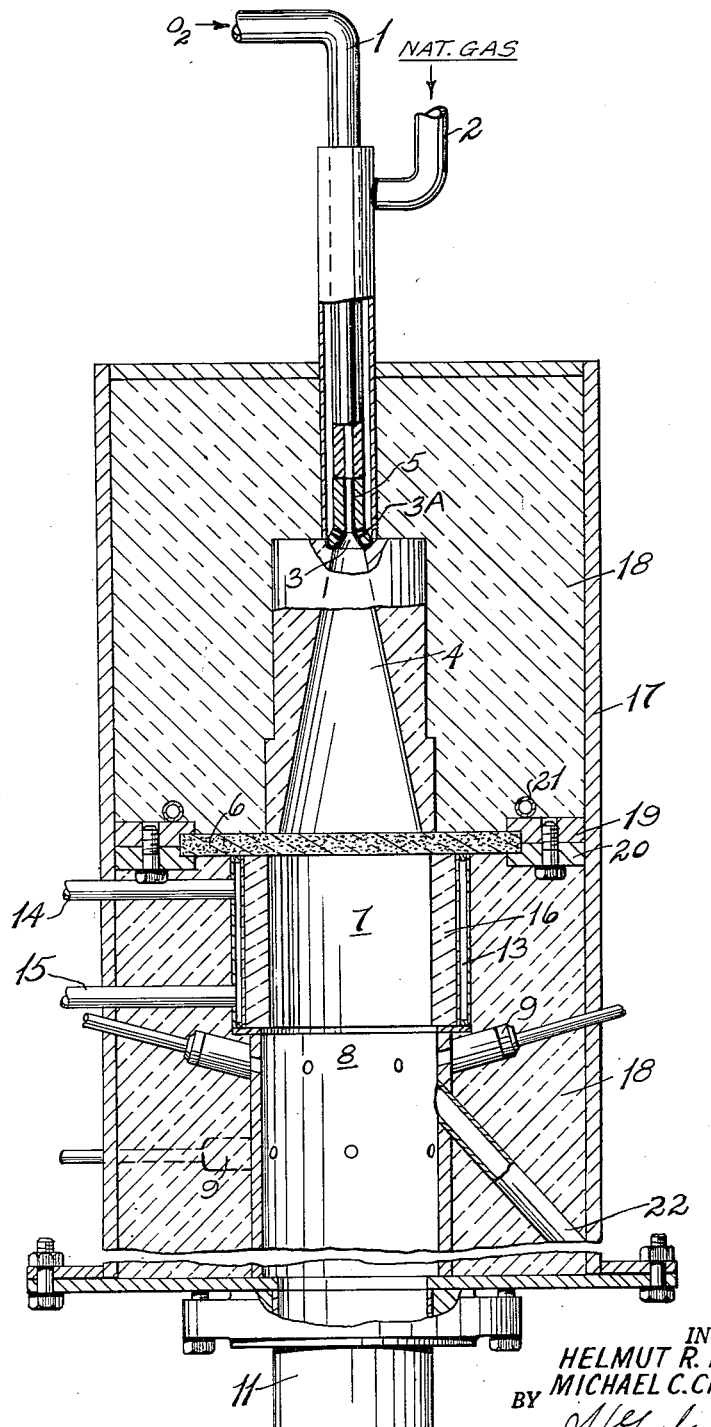

2,765,359
PRODUCTION OF ACETYLENE

Helmut R. Pichler and Michael C. Chervenak, Trenton, N. J., assignors to Hydrocarbon Research, Inc., New York, N. Y., a corporation of New Jersey Application February 10, 1953, Serial No. 336,152

2 Claims. (Cl. 260—679)

This invention relates to a method and apparatus for the reaction of a gasiform hydrocarbon with an oxygen-containing gas. In one of its more specific aspects, it relates to a method of reacting a gasiform hydrocarbon with oxygen to produce acetylene.

The production of acetylene by reaction of a hydrocarbon with oxygen under controlled reaction conditions has been previously investigated. It is known that acetylene may be produced by reacting a hydrocarbon in gas phase with a limited amount of oxygen at a temperature above 2,000° F., and with a reaction time between 0.001 and 0.1 second. Generally, the reaction is conducted at a temperature within the range of from about 2,500° F. to about 3,500° F. The quantity of oxygen relative to the quantity of hydrocarbon is usually within the range of from 0.45 to about 0.65 mol of oxygen per atom of carbon in the hydrocarbon. The process is usually carried out at atmospheric pressure. Quenching the reaction products is necessary to limit the reaction time and to minimize decomposition or other undesired reaction of the acetylene. The reaction may be quenched, or the reaction products "frozen," by substantially instantaneously cooling the reaction products to a temperature well below the reaction temperature, for example, to 800° F., or lower. According to one of the processes of the prior art, relatively pure oxygen and a gasiform hydrocarbon, for example, natural gas or coke oven gas, are admixed with one another and the resulting mixture introduced into a reaction zone through a plurality of openings of small diameter with a velocity through the openings in excess of the rate of flame propagation. The reaction zone contains no packing or catalyst and is so designed that the flow path of the reactants and resulting reaction products through the reactor is relatively short. The reaction products are quenched to limit the total reaction time to a period within the range of 0.001 to 0.1 second.

Normally liquid or normally gaseous hydrocarbons may be utilized in the process. Normally liquid hydrocarbons are vaporized, the vapors admixed with oxygen and passed through the feed plate into the reaction zone. Commercially pure oxygen, e. g., oxygen obtained by rectification of air and containing in excess of about 90 percent oxygen by volume, is suitable for use in this process. Commercial oxygen often is available in a concentration in excess of 95 percent oxygen by volume; such concentrations are preferred.

One difficulty involved in the production of acetylene by partial combustion processes, such as the one briefly described above, is the formation of carbon which accompanies the reaction. The carbon tends to accumulate in the reactor, particularly on the walls of the reactor and on the perforated plate through which the reactants are introduced to the reaction zone. Accumulation of carbon within the reactor is a serious operating difficulty. This carbon must be removed periodically, either by interrupting the flow of hydrocarbon and burning out the carbon deposit with oxygen, or by mechanically scraping the reactor walls and the face of the perforated plate. Another difficulty, is the frequency with which flashbacks, or preignition of the reactants within the mixing zone, take place. Flashbacks and preignition interrupt the operation and often necessitate shutting down the reactor.

The present invention effectively prevents flashbacks. It also prevents accumulation of carbon within the reactor on either the feed plate or the walls of the reactor. The process of our invention now permits continuous production of acetylene by the partial combustion reaction.

In accordance with our invention, a gasiform hydrocarbon is mixed with oxygen in a zone free of catalytic surfaces which promote ignition, e. g., a mixing nozzle made of enamelled metal or ceramic material, and introduced through a porous plate into one end of an empty reaction zone. The walls of the reaction zone are cooled to a temperature considerably below the reaction temperature. Product gases discharged from the end of the reaction zone opposite the porous plate are immediately quenched to a temperature sufficient to prevent undesirable reactions or decomposition of the acetylene. Both the porous plate and the cooled reactor walls constitute improvements over conventional practice, as will be evident from the following more detailed disclosure.

In the practice of the process of our invention, separate streams of hydrocarbon and oxygen are each preheated to a temperature of several hundred degrees and mixed with one another in a mixing nozzle which accomplishes rapid and intimate mixing of the reactants. Spontaneous ignition tends to occur when relatively pure oxygen is mixed with hydrocarbons at high temperatures in the presence of metal. By eliminating metal from the mixing zone, the gases may be preheated to a temperature approaching about 1,200° F. without danger of preignition. Preheating the reactants has a beneficial effect on acetylene yield, the yield increasing as the preheat temperature is increased. As an example of the beneficial effect of high preheat temperature on acetylene yields, comparative data obtained employing oxygen and natural gas as feed indicated an increase in the acetylene content of the product gas from an average of 7.0 volume percent with a preheat temperature of 900° F. to about 8.5 at 1,100° F. In addition to the increased concentration of acetylene in the product gas which results from high preheat temperatures, the oxygen requirements are also reduced. With a preheat temperature of 900° F., approximately 5.6 pounds of oxygen are required per pound of acetylene produced, whereas at 1,100° F. only about 4.4 pounds of oxygen are required per pound of acetylene produced.

Introduction of premixed reactants to the reactor through a porous member prevents flashbacks from the reaction zone to the mixing zone. We have found, unexpectedly, that carbon does not accumulate on a porous barrier as it does on a perforated plate. The porous plate is composed of ceramic or similar refractory material, preferably prepared by cementing or sintering granular or particulate alumina leaving interstitial passageways permeable to the gases. The porous plate is substantially uniformly permeable over its entire surface. In contrast, the perforated plates of conventional practice are composed of relatively impervious material provided with numerous small straight passageways. It is essential that the material of which the plate is constructed be substantially non-catalytic with respect to the reactants to prevent auto-ignition of the preheated reactants before their introduction into the reaction zone.

The gas passageways through the porous member of our invention are of very small cross section with an equivalent diameter on the order of 100 to 1000 microns (0.1 to 1 mm.). These passageways are non-linear, i. e., they do not extend through the plate in straight lines, but instead present tortuous paths for the gas flow.

Alundum plates about one inch in thickness and having a permeability of 80 to 120 standard cubic feet of air per minute per square foot of cross-sectional area with a pressure drop of two inches of water have been found entirely satisfactory. The coarser plates, i. e., the more porous ones, are generally preferred. No effect on acetylene yields have been observed with plates of different porosities.

A gas velocity at the discharge side of the porous plate of from about 10 to about 30 feet per second gives satisfactory operating conditions. Excessively high velocity results in extinction of the flame and cessation of reaction.

The pressure within the reactor is generally maintained at about atmospheric or slightly above atmospheric pressure. The pressure upstream from the porous barrier need be sufficient only to insure the desired rate of feed of reactants into the reaction zone through the porous barrier. With a relatively porous barrier, satisfactory flow rates are obtained with a pressure drop across the plate of from about 0.2 to about 5 pounds per square inch. Generally, a pressure in excess of about 30 pounds per square inch gauge on the upstream side of the porous barrier is undesirable.

The reaction temperature is above about 2,500° F. and preferably not above about 3,200° F. An average temperature of about 2,800° F. has been found satisfactory.

It is interesting to note that, although the alundum plates employed in our operation have a softening point of about 2,200° F., no operating difficulty has been encountered in spite of the fact that the reaction zone is maintained at an average temperature of about 2,800° F. Apparently, the flame rides a short distance away from the face of the plate, and the incoming reactants, which are at a temperature considerably below the reaction temperature, jointly function to maintain the temperature of the plate below the softening or fusion temperature of the material.

In accordance with our invention, the walls of the reaction zone are cooled to a temperature several hundred degrees below the reaction temperature. To prevent carbon deposition, the walls are cooled to a temperature at least about 600° F. below the reaction temperature and preferably to a temperature more than 1,000° F. below the reaction temperature.

The method and apparatus of this invention will be more readily understood by reference to the accompanying drawing, which is an elevational view in cross-section of a preferred embodiment of apparatus of carrying out the invention.

With reference to the drawing, a stream of preheated oxygen is introduced through line 1 and a stream of preheated natural gas is introduced through line 2 into nozzle 3. A stream of oxygen is discharged centrally through the nozzle, while the natural gas discharges through openings 3A. The interior of the nozzle 3 and of openings 3A are provided with a ceramic coating 5. The gaseous mixture is discharged into a conical ceramic inlet chamber 4. Chamber 4 serves also as a mixing zone insuring intimate admixture of the reactants by the time they reach the porous barrier. The mixed gases, preferably highly preheated, then pass through a porous plate or barrier 6 into a ceramic reaction chamber 7. The reaction chamber 7 is cylindrical with the porous plate 6 forming an end wall of the cylinder.

The reaction products discharge from the end of the cylindrical reaction zone opposite the porous plate into a cooling chamber 8 wherein the gases are intimately contacted with water introduced as a spray through a number of nozzles 9 arranged about the wall of the cooling chamber. The cooled gas stream, water vapor, and unvaporized liquid water, are discharged into an outlet conduit 11 from which the products are passed to suitable acetylene recovery equipment.

The reaction chamber 7 is provided with a wall 16 of high temperature refractory, suitably, fused alumina. The inner surface of wall 16 is maintained at a temperature several hundred degrees below the reaction temperature by means of a cooling jacket 13 through which water is circulated. The cooling water is introduced to and discharged from the jacket by means of conduits 14 and 15. Refractory cement may be provided between the cooling jacket 13 and wall 16 of the reaction zone.

The mixing nozzle 3, reactant inlet chamber 4, porous plate 6, reaction chamber 7, and cooling chamber 8 are enclosed within a housing 17 and surrounded with a suitable refractory insulating material 18. The porous plate 6 is held in place by a pair of co-operating clamping rings 19 and 20 which are protected from overheating by a cooling ring 21, through which cooling water, from a suitable source, not illustrated, is continuously circulated.

Ignition of the reactants is accomplished by inserting an igniting element, e. g. an electric spark producing device, through ignition tube 22.

The process of the invention is illustrated in the following example:

A stream of natural gas is preheated to a temperature of about 1,100° F. and admixed in an enamelled mixing nozzle with a stream of substantially pure oxygen (approximately 96 percent oxygen by volume) which has been separately preheated to about 1,100° F. The mixture is passed through an alundum porous plate one inch thick having a permeability of about 120, as defined above, into one end of a cylindrical reaction zone five inches in diameter and four inches in length at the rate of 2,000 standard cubic feet per hour of natural gas and 1,200 standard cubic feet per hour of oxygen. The pressure drop across the porous plate is approximately 2 pounds per square inch. The pressure in the reaction zone is substantially atmospheric. Under these conditions, the temperature within the reaction zone is about 2,800° F.

The cylindrical inner wall of the reaction chamber is composed of fused alumina ⅜ of an inch in thickness. Surrounding the inner wall is a metal-walled water jacket through which cooling water is continuously circulated. The water enters the jacket at about 60° F. and leaves at about 150° F. Calculations based on the heat removed by the cooling water indicate that the refractory wall of the reactor is maintained at a temperature of 1,000° F.

The reaction products are quenched to a temperature of about 180° F. almost instantaneously by contact with water introduced into the product gas by a plurality of spray nozzles. The composition of the product gas, expressed in volume percent (after removal of water), is as follows:

| | |
|---|---|
| Hydrogen | 55.8 |
| Carbon monoxide | 25.5 |
| Acetylene | 8.5 |
| Methane | 5.1 |
| Carbon dioxide | 3.3 |
| Others | 1.8 |

In typical runs, operation has been continued for more than 120 hours without flashbacks and without accumulation of carbon on the porous plate or the walls of the reactor.

Obviously, many modifications and variations of the invention as hereinbefore set forth may be made without departing from the spirit and scope thereof, therefore only such limitations should be imposed as are indicated in the appended claims.

We claim:

1. In a process for production of acetylene by reaction of a hydrocarbon with commercially pure oxygen at temperature above about 2500° F. in an unobstructed reaction zone and rapidly quenching the reaction products after 0.001 to 0.1 second reaction time, the improvement for maintaining the reaction zone dimensionally stable which comprises: forming a mixture of said hydrocarbon and oxygen, and discharging said mixture at a velocity of 10 to 30 feet per second from the discharge side of a porous plate having permeability of at least 80 into a reaction zone autogeneously maintained at reaction temperature and laterally defined by imperforate walls externally cooled to a temperature at least about 600° F. below said reaction temperature.

2. The process of claim 1 wherein the hydrocarbon and oxygen are preheated to a temperature above about 1000° F. and said walls are maintained at a temperature not substantially above 1000° F.

References Cited in the file of this patent

UNITED STATES PATENTS

| | | |
|---|---|---|
| 1,823,503 | Mittasch et al. | Sept. 15, 1931 |
| 1,965,771 | Groll et al. | July 10, 1934 |
| 1,995,136 | Winkler et al. | Mar. 19, 1935 |
| 2,191,510 | Whitehurst | Feb. 27, 1940 |
| 2,529,598 | Deanesly | Nov. 14, 1950 |
| 2,672,488 | Jones | Mar. 16, 1954 |